(12) United States Patent
Liu

(10) Patent No.: US 7,708,814 B2
(45) Date of Patent: May 4, 2010

(54) CARBON DIOXIDE ABSORPTION DEVICE

(76) Inventor: Chia-Chang Liu, P.O.Box 166-13, Taipei (TW) 115

( * ) Notice: Subject to any disclaimer, the term of this patent is extended or adjusted under 35 U.S.C. 154(b) by 0 days.

(21) Appl. No.: 12/078,357

(22) Filed: Mar. 31, 2008

(65) Prior Publication Data

US 2008/0302244 A1    Dec. 11, 2008

(51) Int. Cl.
   *B03C 3/017*    (2006.01)
(52) U.S. Cl. .................. 96/52; 95/58; 95/60; 95/64; 95/71; 95/73; 95/77; 95/173; 95/175; 95/236; 96/63; 96/94; 96/193; 96/194; 422/255; 422/285; 423/222
(58) Field of Classification Search ............ 96/52, 96/53, 60, 62, 63, 94, 193, 194; 95/58, 60, 95/64, 71–73, 77, 172–175, 236, 266; 423/222, 423/230, 232, 437.1, 438; 422/255, 285–289
See application file for complete search history.

(56) References Cited

U.S. PATENT DOCUMENTS

| | | | | |
|---|---|---|---|---|
| 1,034,668 A | * | 8/1912 | Wright | 204/669 |
| 3,154,087 A | * | 10/1964 | Beaver | 137/15.04 |
| 3,727,375 A | * | 4/1973 | Wallace | 95/68 |
| 5,256,172 A | * | 10/1993 | Keefer | 423/230 |
| 5,509,294 A | * | 4/1996 | Gowing | 73/19.05 |
| 5,866,090 A | * | 2/1999 | Nakagawa et al. | 423/230 |
| 6,521,026 B1 | | 2/2003 | Goto | |
| 6,966,942 B2 | * | 11/2005 | Broadbent | 95/64 |
| 7,425,092 B1 | * | 9/2008 | Tessien | 366/114 |
| 2003/0056648 A1 | * | 3/2003 | Fornai et al. | 95/65 |
| 2006/0159553 A1 | * | 7/2006 | Tessien | 417/53 |

FOREIGN PATENT DOCUMENTS

JP    6-142409 A    *    5/1994    ............ 96/193

* cited by examiner

*Primary Examiner*—Richard L Chiesa

(57) ABSTRACT

Carbon dioxide contained within exhaust gas is combined with bivalent metal ions such as calcium ions or the like in concentrated salt water to form precipitated calcium carbonate and then can be expelled out. Such an environmental friendly design is realized by a bottle upside down device with a bottle neck exit on a bottom. A piston inside the device can be elevated to a top portion to produce a near vacuum air pressure inside the device. All the brine, exhaust gas, and oxygen, ozone drawn together into the device can be accelerated to form, at least, precipitated calcium carbonate to reduce carbon dioxide contained within the exhaust gas. Chemical reaction is accelerated by a high voltage discharger below the piston and by flashing a portion of water to atomize the brine. A heater can heat up the near vacuum device to accelerate chemical reaction.

10 Claims, 6 Drawing Sheets

CARBON DIOXIDE ABSORPTION DEVICE

FIELD OF THE INVENTION

The present invention is related to a device in a shape of an upside down bottle operated under a near vacuum pressure for atomization of a brine in addition with a high voltage discharger discharging little current, oxygen, ozone, carbon dioxide, and the atomized brine mixed together combined to form precipitated calcium carbonate etc., and expelled out to reduce carbon dioxide emission in exhaust gas.

BACKGROUND OF THE INVENTION

Global warming affects our ecosystem; wherein carbon dioxide solely takes two thirds of the total anthropogenic greenhouse gas. Up to now, carbon dioxide concentration existed in the atmosphere one third higher since industrial evolution era. Once carbon dioxide content reaches up to two times higher than pre-industrial times, human-induced climate change causes global temperature has risen by degrees; sea level rises over hundred year records. Climate change around the world precipitates droughts, floods and hurricanes happened to us more frequently. Fires, infectious diseases or insect pests caused great damages to crop production. Rising sea level impacts animal habitat, ecosystem or even entire seaside community removed. To meditate on global warming problems, how to implement and elaborate an effective carbon dioxide absorption measure is expected by the present invention.

STATUS OF PRIOR ARTS

To reduce carbon dioxide emission, persons skilled in the art has provided such as U.S. Pat. No. 6,521,026 entitled "Regenerative type carbon dioxide separator and carbon dioxide" to Kazushige Goto on Jun. 20, 2001 (hereinafter brief as '026) taught that a rotatable rotor absorbing carbon dioxide gas about 400~580° C., releasing the same at 600° C. or more; wherein a first and a second gas passing through the rotor and being led off in different ways by a rotatable separator, carbon dioxide contained in the first gas is absorbed, by lithium zirconate ($Li_2ZrO_3$, $Li_4ZrO_4$) through a first gas flow passage at lower temperature by releasing heat; also, by the same lithium zirconate ($Li_2ZrO_3$, $Li_4ZrO_4$) "absorbent" carbon dioxide released (or regenerated) into the second gas by absorbing heat and rotating the rotor within a second gas flow passage at higher temperature.

In '026, lithium zirconate granules supported on a honeycomb or briquette shaped ceramics or metal or applied on a porous zeolite used as solid absorbent to reduce carbon dioxide; however, carbon dioxide is absorbed, but also is necessarily considered released in '026. Furthermore, carbon dioxide absorbed by lithium zirconate is detrimentally required a higher temperature. More energy is wasted for such timely but hotly absorption of carbon dioxide. Therefore, when a working temperature is higher or lower than a required temperature, carbon dioxide efflux is not properly reduced, but more energy-consumption is deemed unintentionally wasted than ever. Carbon dioxide contained in air made absorbent, such as lithium zirconate, less likely bring into full absorption of carbon dioxide or "burned out" the same. On one hand, for example, even carbon monoxide may be further burned, but complete combustion always yields carbon dioxide. Obviously, carbon dioxide through heated process is considered part of a regenerative cycle, not to be "consumed up", but just "sequestrated" or the like. On the other hand, hopefully when carbon dioxide amassed, absorbent absorb carbon dioxide actively and swiftly, while diffused, absorbent may act slowly but stably. Supposed exhaust gas efflux is continuously increasing to our ambient environment, how to reduce carbon dioxide emission requires more elaborate preparation.

Accordingly, the present invention provides a carbon dioxide absorption device operated mainly under near vacuum pressure, by flashing, at least, a portion of water contained in brine into steam to atomize the brine, and further a high voltage discharger accelerates oxygen and ozone to react with carbon dioxide contained within exhaust gas and the atomized brine to form calcium carbonate or the like.

If required, a heater installed to the device can accelerate reaction ratio for the calcium carbonate rapidly precipitated to a bottom of the device.

SUMMARY OF THE INVENTION

The present invention is to provide a carbon dioxide absorption device by flashing a portion of water contained in brine into steam to absorb carbon dioxide contained in exhaust gas to form such as calcium carbonate to be expelled out.

As above, a carbon dioxide absorption device comprises: a device (1) in the shape of an upside down bottle has an exit (13) in the shape of a bottle neck portion formed on a bottom thereof;

A water inlet pipe (10) connected to the device (1) draws a brine into the device (1);

A first inlet pipe (11) connected to the device (1) draws a mixture of oxygen and ozone into the device (1);

A second inlet pipe (12) connected to the device (1) draws an exhaust gas (8) into the device (1);

Characterized in that: a piston (2) inside the device (1) moved upward to a top portion of the device lowers a pressure inside the device to near vacuum air pressure, by flashing, at least, a portion of water contained into a steam to atomize the brine, further a high voltage discharger (3) below the piston accelerates the atomized brine (5), the mixture of oxygen and ozone, and the exhaust gas to form, at least, precipitated calcium carbonate (6) and residues at the exit (13) to be expelled out.

The carbon dioxide absorption device as mentioned above is characterized in that said water inlet pipe (10) is equipped with a check valve (14).

The carbon dioxide absorption device as mentioned above is characterized in that said first inlet pipe (11) is equipped with a check valve (14).

The carbon dioxide absorption device as mentioned above is characterized in that said second inlet pipe (12) is equipped with a check valve (14).

The carbon dioxide absorption device as mentioned above is characterized in that said second inlet pipe (12) is further equipped with a de-sulfur device (16).

The carbon dioxide absorption device as mentioned above is characterized in that said exit (13) is equipped with a control valve (15) for expelling out the products (6).

The carbon dioxide absorption device as mentioned above is characterized in that said brine can be further selected from one of the following: concentrated salt water or bivalent metal ions contained in water.

The carbon dioxide absorption device as mentioned above is characterized in that carbon dioxide is contained within the exhaust gas.

The carbon dioxide absorption device as mentioned above is characterized in that said device is further equipped with a heater (4) to the bottom of the device (1).

The carbon dioxide absorption device as mentioned above is characterized in that the heater (4) is disposed at the exit of the device.

DETAILED DESCRIPTION OF THE PREFERRED EMBODIMENTS OF THE PRESENT INVENTION

The description is described in detail according to the appended drawings hereinafter.

Figure 1:
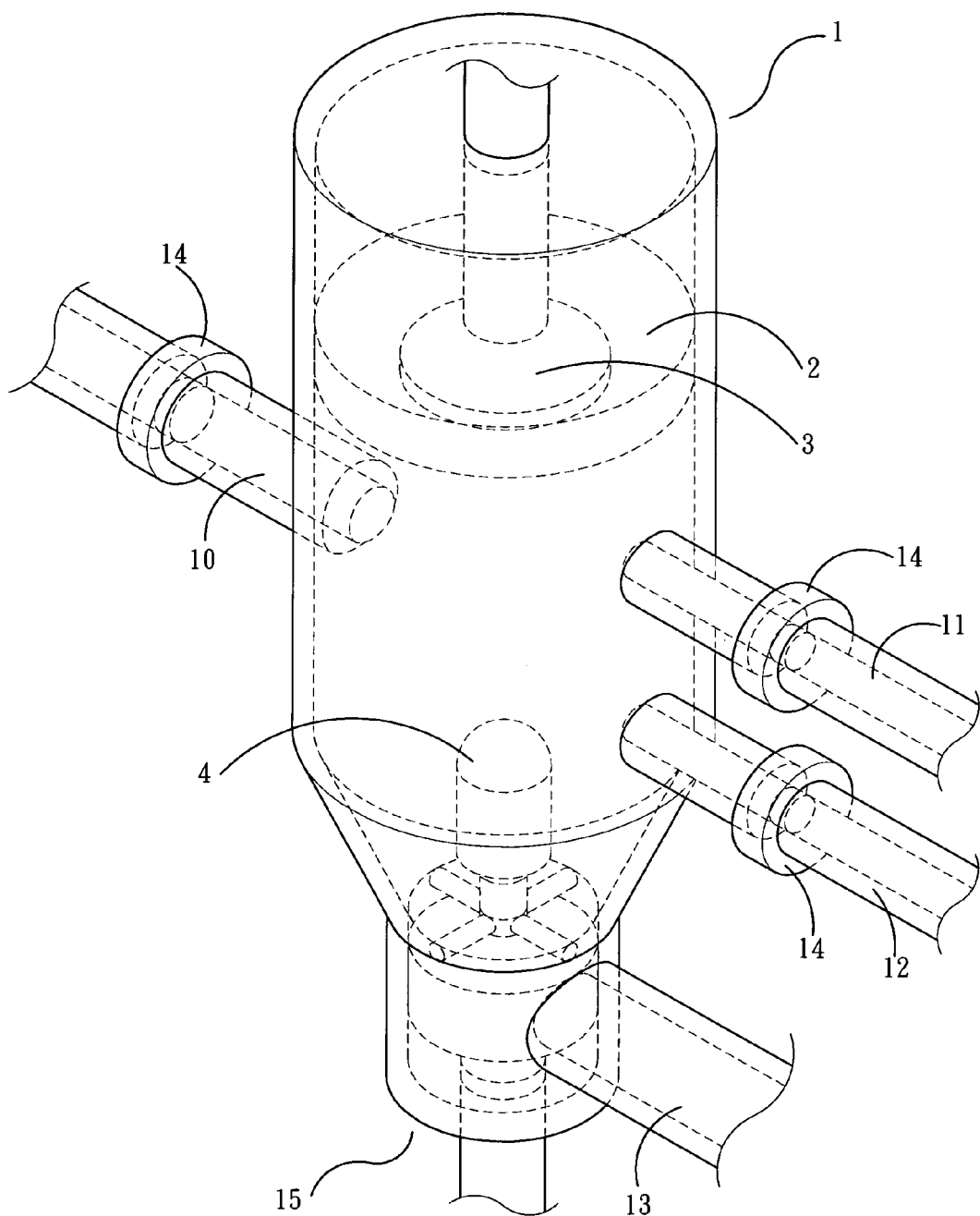
FIG. 1: is a perspective view of the carbon dioxide absorption device of the present invention.
Figure 2:
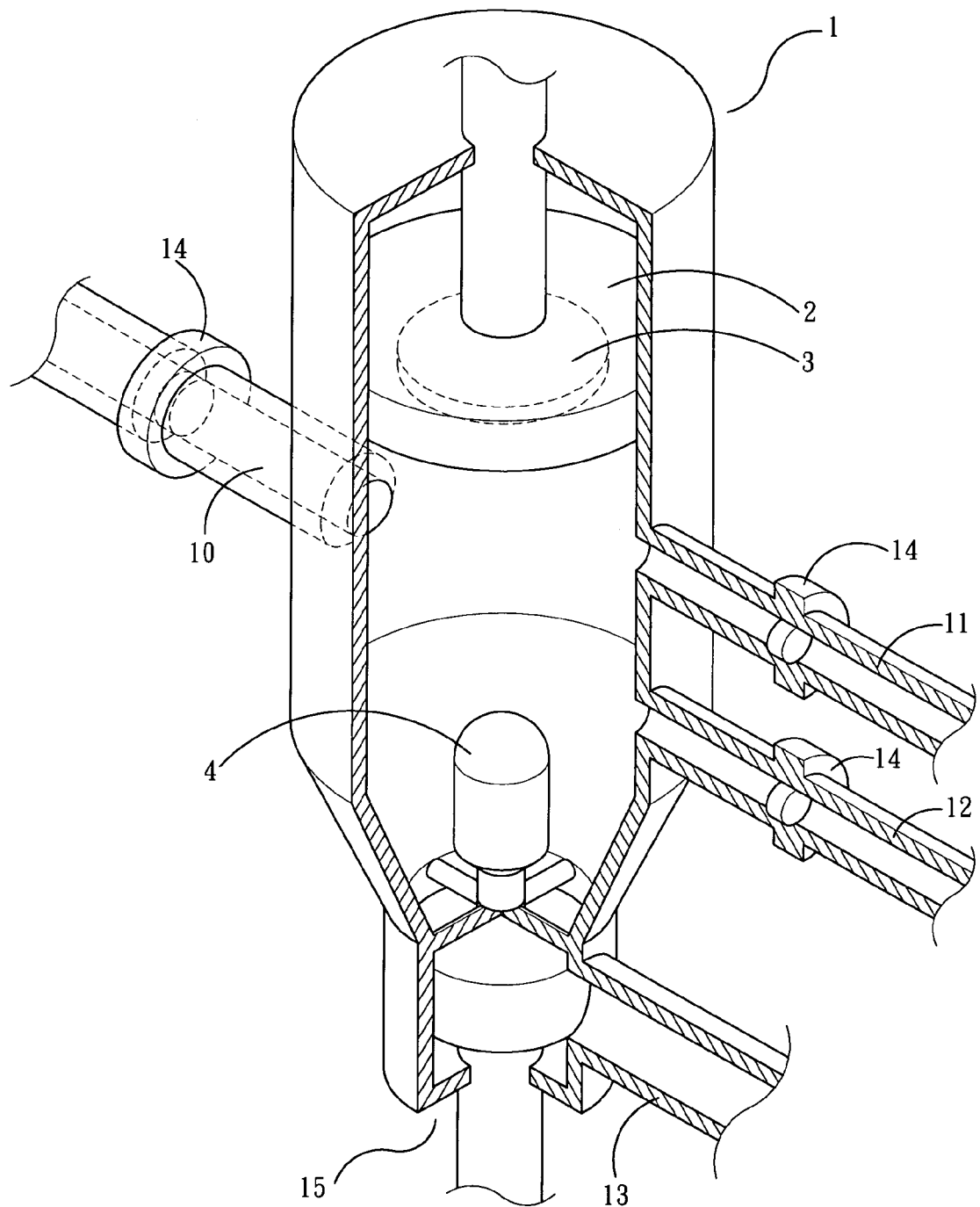
FIG. 2: is a cross sectional view of FIG. 1 in part.

As shown in FIG. 1, a carbon dioxide absorption device is illustrated. The carbon dioxide absorption device includes a device (1) in the shape of an upside down bottle, an exit (13) in the shape of a bottle neck portion formed at a bottom of the device (1), a brine (5) passed through chemical reaction can be expelled out therethrough. A water inlet pipe (10) connected to the device (1) draws the brine (5) into the device (1). A first inlet pipe (11) connected to the device (1) draws a mixture of oxygen and ozone into the device (1). A second inlet pipe (12) connected to the device (1) draws an exhaust gas into the device (1). A piston (2) disposed inside the device (1), a bottom of the piston (2) is added with a high voltage discharger (3) hung below.

Since the device (1) is physically insulated from an ambient environment; therefore, the exhaust gas drawn into the device (1) could not flow back to outside of the device. Second time environmental contamination is prevented from happening to the device, further a significant amount of exhaust gas retained inside the device (1). After carbon dioxide absorption, the exhaust gas (8) inside the device (1) is purified and carbon dioxide contained within the exhaust gas is reduced.

Next, the piston (2) reciprocally moved upward and downward may adjust an air pressure inside the device (1). After the brine (5), the mixture of oxygen and ozone, and the exhaust gas (8) draw together in the device (1), all the inlet pipes (10, 11, 12) equipped with a one-way check valve (14) respectively stop flowing fluids into the device (1), further, fluids could not flow back, but mix and draw together in the device (1). The piston (2) is moved upward to a top portion inside the device (1), thus the air pressure inside the device (1) is lowered less than one atmosphere pressure approximate to vacuum. More than forty minerals or impurities such as calcium, magnesium, sodium . . . etc., contained in the brine or simply bivalent metal ions contained within water as a processed half-product, by flashing a portion of water and the ions contained therein into steam to atomize the brine, the high voltage discharger (3) below the piston (2) discharge a high voltage low current to the atomized brine, the mixture of oxygen, ozone, and carbon dioxide contained within the exhaust gas, accelerate a chemical reaction to form such as precipitated calcium carbonate (6) etc., to the bottom of the device. Or the calcium carbonate (6) may be delayed days or weeks to be precipitated naturally, or more devices may be added to produce a significant amount of precipitated calcium carbonate or the like.

Either brine or exhaust gas normally are unwanted substances for most manufacturers. Carbon dioxide absorption device of the present invention is more cost-saving than the same used through solid, liquid, or membrane means. It may be suitable for middle or little enterprise to improve second time environmental contamination.

Check valve (14) is designed for fluids flowing into the device (1) only opened in one-way direction. Device (1), at least, can be used as a conditional carbon dioxide sequestration measure, or temporary intake of the exhaust gas mixed with brine, oxygen, and ozone. After flashing a portion of water through near vacuum air pressure inside the device (1) accelerates chemical reaction, such as precipitated calcium carbonate (5) or other residue etc., deposited to the bottom of the device to the exit, further can be selectively expelled out to reduce second time environmental contamination. Or the same can be retained in the device (1) for a further heated process to accelerate more of the precipitated calcium carbonate or the like accumulated to the exit.

Said second inlet pipe (12) is further equipped with a de-sulfur device (16) to remove most sulfides from the exhaust gas (8). Moreover, erosive acid material can be depleted, and reaction ratio can be increased.

Said exit (13) is also equipped with a control valve (15) to determine whether the calcium carbonate (5) and residue expelled out or not. When the exhaust gas (8) inside the device (1) almost consumed up, the control valve (15) is activated to expel out the calcium carbonate (6) and the residue. At that time, exhaust gas (8) is less likely to induce second time environmental contamination.

As above, said brine (5) can be further selected from one of the following two substances: concentrated salt water, or bivalent metal ions contained within water. Carbon dioxide is contained in said exhaust gas (8). Since the brine and exhaust gas are normally wasted substances produced through industrial manufacturing process, these two substances reacted in the device (1) and expelled out altogether to reduce environmental contamination factors.

In addition, a heater (4) is disposed at inside the bottom of the device (1) close to the exit (13). When the brine, mixtures of exhaust gas, oxygen and ozone react in the device (1), the heater (4) can be used to speed up the reaction.

Figure 3:
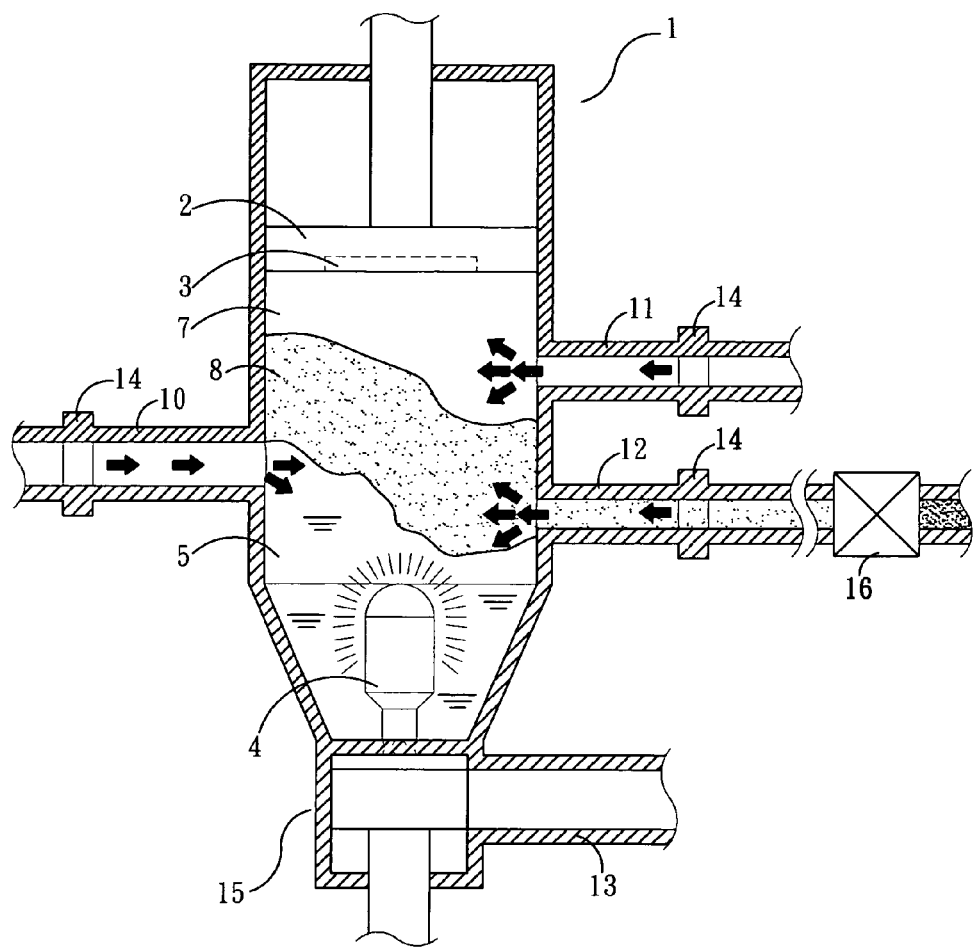
FIGS. 3-6: are sectional views of embodiments of the present invention.

As shown in FIGS. 3~6, sectional views of the embodiments of the present invention are illustrated. When the water inlet pipe (10), the first inlet pipe (11), the second inlet pipe (12) are opened respectively to draw the brine (5), the mixture of oxygen and ozone, and the exhaust gas (8) into the device (1). Once the brine (5) is insufficiently reacted inside the device (1), the heater (4) can be used to heat up the device (1) to accelerate chemical reaction. (as shown in FIG. 3)

Figure 4:
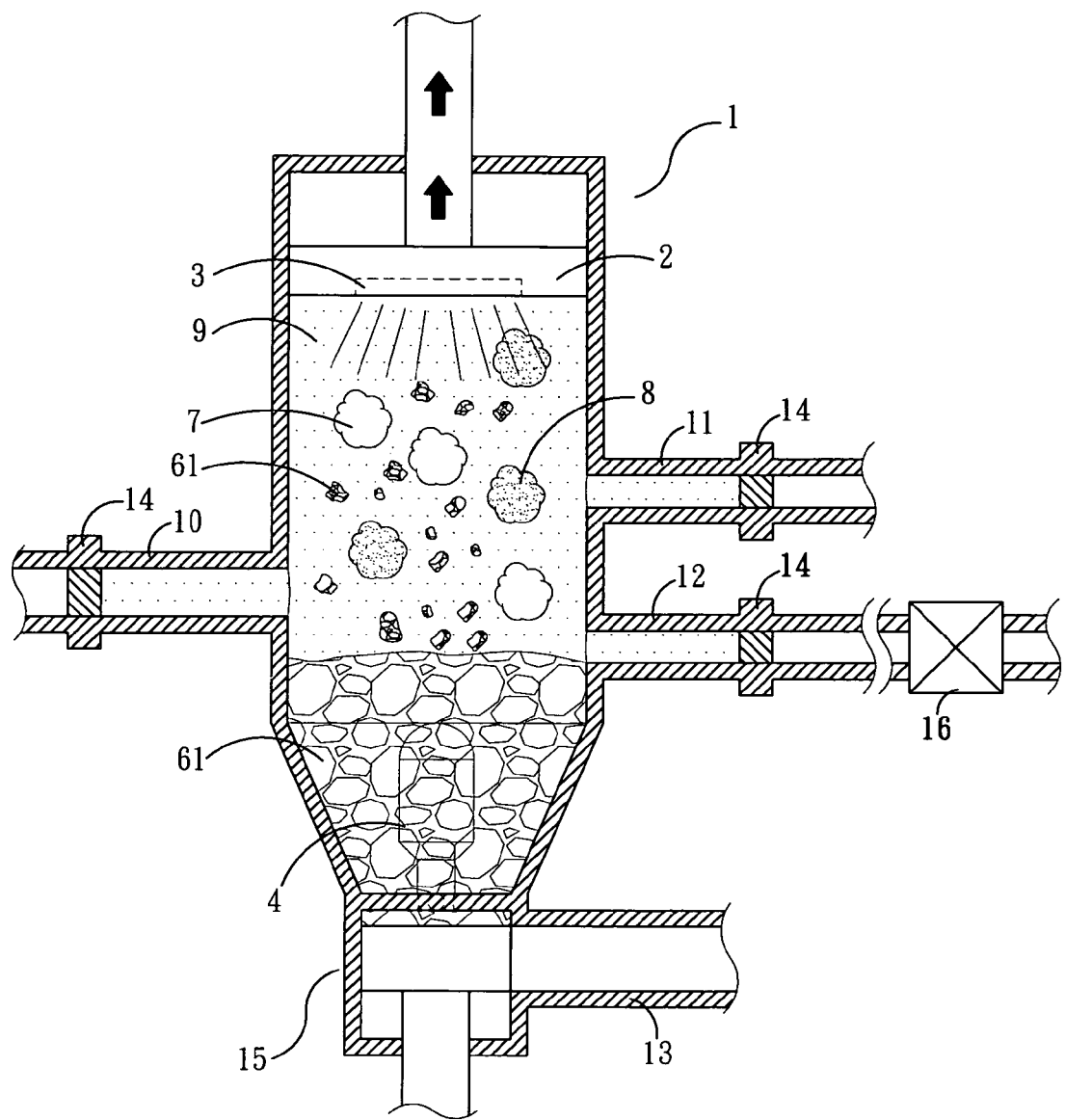

When the brine, the mixture of oxygen and ozone, and the exhaust gas are amassed to a significant amount, all the check valves (14) can seal each of the pipes, and the device (1) is insulated from the ambient environment. After that, the piston (2) can be moved upward to lower the air pressure inside the device (1) to near vacuum about 0.03 atmosphere pressure. Where the brine inside the device (1) amassed and by flashing a portion of water contained in the brine (5) into water vapor. And the mixture of oxygen and ozone, carbon dioxide contained within exhaust gas, and the brine (brine or bivalent metal ions contained in water) are reacted in the device (1), precipitated calcium carbonate (61) or the like, the residue deposited to the bottom of the device. By means of the high voltage discharger (3), a solid calcium carbonate (61) can be formed rapidly to deposit to the bottom of the device (1). (as shown in FIG. 4)

Figure 5:
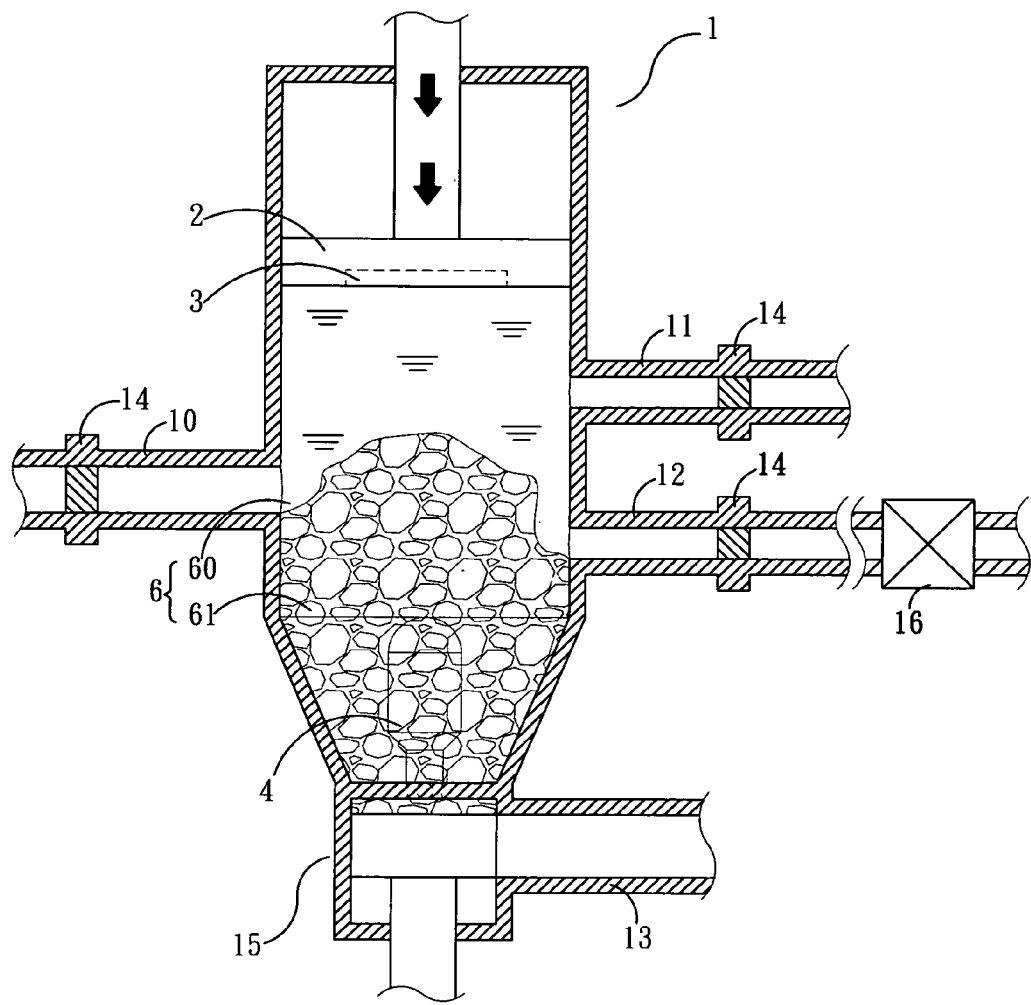
Figure 6:
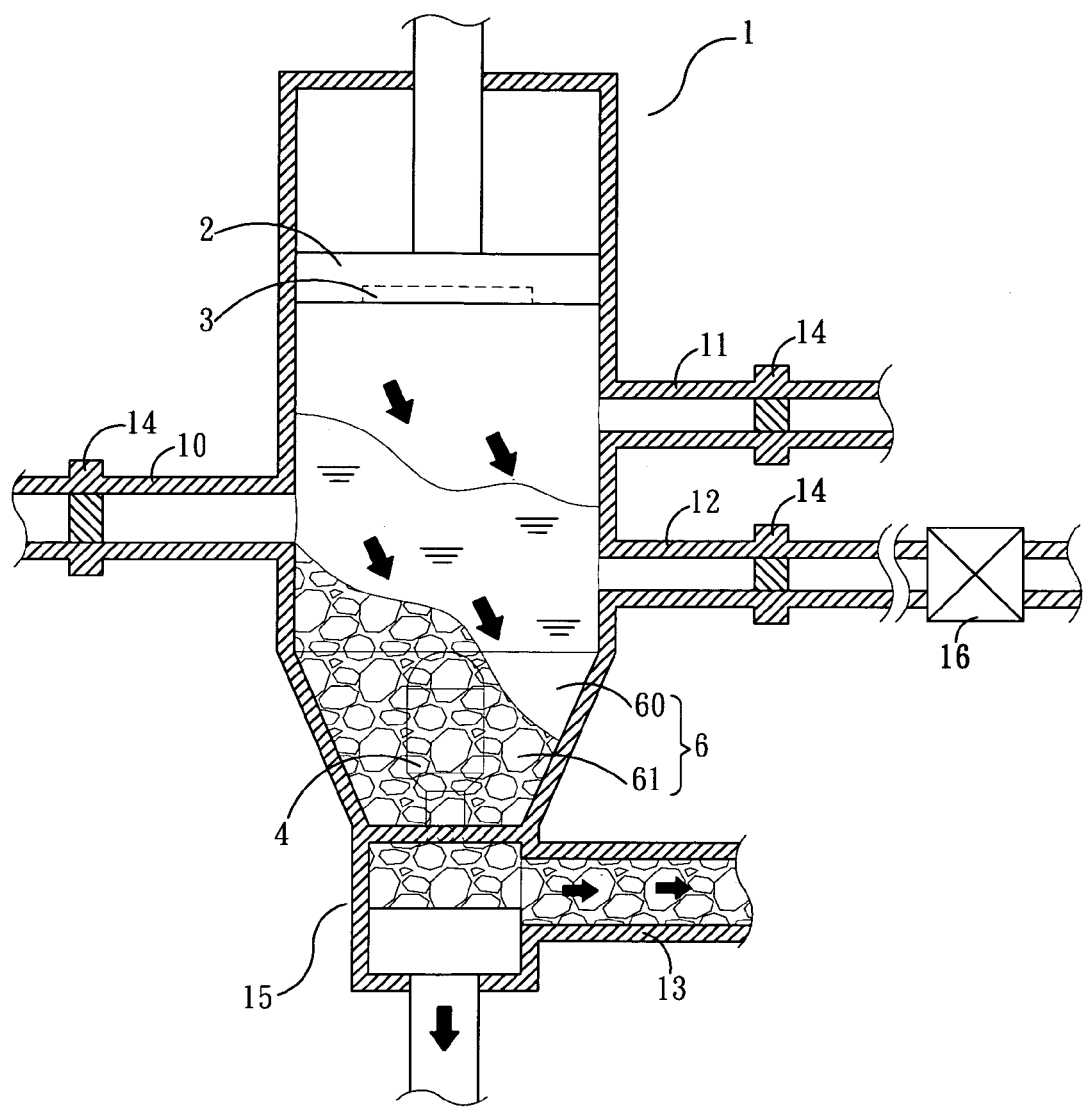

When carbon dioxide contained in the exhaust gas (8) almost consumed up, the piston (2) can be lowered to restore a normal air pressure inside the device (1), steam or water vapor (9) inside the device (1) distilled into water (60), therefore, the solid calcium carbonate (61) incorporate with water (60) are combined as the precipitated calcium carbonate (6) and the residue (not shown). (as shown in FIG. 5)

When the exhaust gas (8) is consumed up, the precipitated calcium carbonate (6) and the residue can be expelled out of the device (1).

ADVANTAGES OF EMBODIMENTS OF THE INVENTION

Merits can be achieved by embodiments of the present invention as following:

1. Brine (5) as a by product through a desalination process, flashing a portion of water to atomize the brine inside the device (1), which is in the shape of an upside down bottle and easily insulated from ambient environment. Exhaust gas (8) led in the device (1) could not flow back to cause second-time contamination.

2. Piston (2) can be reciprocally moved upward and downward to control an air pressure inside the device (1). When the piston (2) is moved upward to a top portion inside the device, a high voltage discharger (3) hung below the piston (2) discharges high voltage little current to the mixture, at least, the discharger (3) provides electrons and heat for rapid reaction between the carbon dioxide, oxygen, ozone and brine together to a significant amount. Piston (2) moved upward to seal a top of the device, further check valves (14) seal all the inlet pipes (10, 11, 12). Under such circumstance, the device (1) is physically insulated from an ambient environment; air pressure inside the device (1) is substantially lowered less than one atmosphere pressure approximate to vacuum pressure. At least, by flashing a portion of water contained in the brine (5) into steam can atomize the brine further react with carbon dioxide contained within the exhaust gas, the mixture of oxygen and ozone is accelerated by high voltage discharger to produce calcium carbonate to reduce carbon dioxide in the exhaust gas.

3. Brine (5) can be further selected from concentrated salt water as by product of water desalination. For example, during distilling sea water, some fresh water or salt water is heated up to produce water vapor with a radiant heat and a convection heat. When such concentrated salt water drawn into the device together with heat possibly increase reaction ratio in the device (1).

4. Either brine or exhaust gas normally are unwanted substances for manufacturing products. Carbon dioxide absorption device is more cost-saving than the same used through solid, liquid, or membrane means. It is suitable for middle or little enterprises.

What is claimed is:

1. A carbon dioxide absorption device comprises: a device (1) in the shape of an upside down bottle has an exit (13) in the shape of a bottle neck portion formed on a bottom;
  a water inlet pipe (10) connected to the device (1) draws a brine (5) into the device (1);
  a first inlet pipe (11) connected to the device (1) draws a mixture of oxygen and ozone (7) into the device (1);
  a second inlet pipe (12) connected to the device (1) draws an exhaust gas (8) into the device (1);
  wherein a piston (2) inside the device (1) moved upward to a top portion thereof to induce a near vacuum pressure of about 0.03 atmosphere pressure; at least, by flashing a portion of water contained in the brine (5) into steam to atomize the brine (5);
  a high voltage discharger (3) hung below the piston (2) discharges a high voltage low current to accelerate the mixture of oxygen and ozone (7), the exhaust gas (8) and impurities of the atomized brine (5) to form, at least, precipitated calcium carbonate (6) and residues at the exit (13) to be selectively expelled out.

2. The carbon dioxide absorption device of claim 1 characterized in that said water inlet pipe (10) is equipped with a check valve (14).

3. The carbon dioxide absorption device of claim 1 characterized in that said first inlet pipe (11) is equipped with a check valve (14).

4. The carbon dioxide absorption device of claim 1 characterized in that said second inlet pipe (12) is equipped with a check valve (14).

5. The carbon dioxide absorption device of claim 1 characterized in that said second inlet pipe (12) is further equipped with a de-sulfur device (16).

6. The carbon dioxide absorption device of claim 1 characterized in that said exit (13) is equipped with a control valve (15) for expelling out the products (6).

7. The carbon dioxide absorption device of claim 1 characterized in that said brine is further selected from one of the following: concentrated salt water and bivalent metal ions contained in water.

8. The carbon dioxide absorption device of claim 1 characterized in that carbon dioxide is contained within the exhaust gas.

9. The carbon dioxide absorption device of claim 1 characterized in that said device is further equipped with a heater (4) at the bottom of the device (1).

10. The carbon dioxide absorption device of claim 9 characterized in that the heater (4) is disposed at the exit of the device.

* * * * *